(12) United States Patent
Biebach

(10) Patent No.: US 6,975,090 B2
(45) Date of Patent: Dec. 13, 2005

(54) POWER CONVERTER DEVICE FOR ONE OF SEVERAL MOTOR WINDINGS ON RELUCTANCE MOTOR

(75) Inventor: Jens Biebach, Gautling (DE)

(73) Assignee: Magnet-Motor Gesellschaft fur Magnetmotorische Technik mbH, (DE)

( * ) Notice: Subject to any disclaimer, the term of this patent is extended or adjusted under 35 U.S.C. 154(b) by 49 days.

(21) Appl. No.: 10/470,725

(22) PCT Filed: Jan. 17, 2002

(86) PCT No.: PCT/EP02/00448

§ 371 (c)(1),
(2), (4) Date: Dec. 3, 2003

(87) PCT Pub. No.: WO02/061935

PCT Pub. Date: Aug. 8, 2002

(65) Prior Publication Data

US 2004/0075413 A1    Apr. 22, 2004

(30) Foreign Application Priority Data

Jan. 31, 2001   (DE) ............................. 101 04 275

(51) Int. Cl.[7] ............................................. H02P 1/46

(52) U.S. Cl. ..................... 318/700; 318/701; 318/254; 318/721

(58) Field of Search .......................... 318/700, 701, 318/254, 721, 138, 439

(56) References Cited

U.S. PATENT DOCUMENTS

| | | | | |
|---|---|---|---|---|
| 5,548,196 A | * | 8/1996 | Lim | 318/701 |
| 6,486,628 B2 | * | 11/2002 | Honma et al. | 318/254 |
| 6,617,820 B2 | * | 9/2003 | Carlson et al. | 318/727 |
| 6,693,403 B2 | * | 2/2004 | Chen | 318/701 |
| 6,737,822 B2 | * | 5/2004 | King | 318/375 |

FOREIGN PATENT DOCUMENTS

EP    0 527 053 A2    2/1993

OTHER PUBLICATIONS

Barnes et al., "Power Electronic Converters for Switched Relunctance Drivers", IEEE Transactions on Power Electronics, vol. 13, No. 6, Nov. 1998 (pp. 1100-1111).

* cited by examiner

Primary Examiner—Rina Duda
(74) Attorney, Agent, or Firm—Venable, LLP; Robert Kinberg; Jeffri A. Kaminski

(57) ABSTRACT

A power converter device for a switched reluctance motor, comprises a semiconductor circuit arrangement in the form of an asymmetric inverter, to supply one of the motor windings on the reluctance motor with current or to commutate the current from the winding. The achievement of the maximum possible current amplitude may be accelerated and the commutating of the current from the motor winding may be accelerated, whereby, in addition to the main voltage source, an additional voltage source in the form of a circuit extension is provided, which, by means of providing an additional voltage of corresponding polarity, accelerates the current feed to the relevant motor winding, or accelerates the removal of the current (commutating) from the motor winding.

16 Claims, 3 Drawing Sheets

POWER CONVERTER DEVICE FOR ONE OF SEVERAL MOTOR WINDINGS ON RELUCTANCE MOTOR

FIELD OF THE INVENTION

The invention relates to a power converter apparatus for one of two or more motor windings in a switched reluctance motor.

BACKGROUND OF THE INVENTION

A power converter apparatus such as this has a semiconductor circuit arrangement in the form of an asymmetric inverter, which is fed from a m voltage source, in particular a DC voltage intermediate circuit.

First of all, a known power converter apparatus for a switched reluctance motor will be described with reference to FIGS. 1 and 2.

As is shown in FIG. 1, a reluctance motor 1 contains a rotor 2 which has at least three poles and with which at least two stator parts S1 and S2 are associated. The stator part S1 comprises a motor winding 4 and a core 8, while the stator part S2 comprises a motor winding 6 and a core 10. The motor windings 4 and 6 are connected to power converter apparatuses 12 and 14, respectively, which are both fed from a voltage $U_d$, which is produced by a main voltage source which in this case is in the form of a DC voltage intermediate circuit 20. A control device 16 controls both the power converter apparatuses 12 and 14.

FIG. 2 shows a 30own power converter apparatus 12 or 14, connected to an associated respective motor winding 4 or 6.

The power converter apparatus contains two series circuits, each formed by a respective power semiconductor T1 or T2, and a diode D1 or D2.

The connecting nodes N1 and N2 between the respective power semiconductors and the diodes form the connections between the respective power converter apparatus and the associated motor winding.

As is known with a reluctance motor such as this, the gradient of the inductance change increases as the motor speed increases, for which reason the desired current amplitude is no longer reached at high motor speeds, at which the time which is available for current to flow to and from the motor winding becomes ever shorter. This reduces the driving torque. Furthermore, the decay in the current is delayed. If the decay duration of the current is too great, this results in a braking torque.

SUMMARY OF THE INVENTION

The invention is based on the object of specifying a power converter apparatus of the type mentioned initially, by means of which a torque which is considerably better than that with known apparatuses is achieved, in particular at relatively high motor speeds.

According to the invention, this object is achieved in that an additional voltage source with a variable polarity is connected in series with the motor winding (the motor phase), and in that a control device is provided, which, matched to the operation of the inverter, a) provides an additional positive driving voltage from the additional voltage source when current is flowing through the motor winding; and/or b) assists the off-commutation of the current from the motor winding by means of an additional negative voltage from the additional voltage source, and c) when required, can make the additional voltage source inoperative.

The basic idea of the invention is to speed up the current flow to the motor winding by increasing the voltage, in order that the desired current amplitude can be reached more quickly, and/or to speed up the drop in voltage during the off-commutation process, by using a negative voltage.

The additional voltage source preferably produces a variable-amplitude voltage. The variable amplitude of the additional voltage allows the operation of the reluctance motor to be optimally matched to the respective requirements.

It is particularly advantageous for the additional voltage source to be formed by an energy store which is fed from the connected motor winding. The additional voltage source preferably then comprises a capacitor, which is connected in series with the motor phase and with the main voltage source by means of drivable semiconductor switches. The direct connection of the additional voltage source to the motor winding prevents the rest of the inverter circuit, which corresponds to the known power converter apparatus, from being subjected to an increased voltage and current load.

The capacitor, which acts as an energy store, is connected together with drivable semiconductor switches to the motor winding. The drivable semiconductor switches are operated by the control device on the basis of the requirements for the respective operating state. Apart from this drive for the semiconductor switches for the connected capacitor, no further measures are required. This means that the additional voltage source according to the invention together with the associated elements can be designed as an autonomous circuit extension, which can also be retrofitted and which can be connected without problems to existing power converter apparatuses, for example also in the form of a plug connection.

Owing to the autonomous character of the circuit extension according to the invention, it can be connected or disconnected as required. This option offers numerous advantages for practical use, as will be described in more detail further below.

One preferred embodiment of the power converter apparatus according to the invention provides the following features:

a) the semiconductor switch arrangement of the asymmetric inverter comprises two branches, and each branch has in each case one switchable power semiconductor, for example a power transistor, which is connected in series with a diode which is reverse-biased with respect to the DC voltage intermediate circuit, with the diode in one branch being connected to the negative pole of the DC voltage intermediate circuit, and that in the other branch being connected to the positive pole of the DC intermediate circuit;

b) the motor winding and the circuit extension according to the invention, comprising a capacitor, two diodes and two switchable power semiconductors, are connected in series between the connecting nodes of the elements of the two series circuits; and c) the capacitor is connected by means of semiconductor switches such that energy is drawn from it, energy is stored in it, or the state of charge on the capacitor is not changed.

In particular, the invention provides for two series circuits each comprising a diode and a semiconductor switch to be connected in parallel with the capacitor, whose connecting nodes are connected to the connecting nodes of one of the two series circuits of the asymmetric inverter, and to the motor winding. These elements of the power converter circuit according to the invention or of the circuit extension for a power converter circuit may in a relatively simple manner be in the form of a module which can be connected or plugged in.

Various operating modes can now be provided, depending on the drive to the semiconductor switches, for the asymmetric inverter and for the semiconductor switches which are associated with the capacitor.

One particularly important operating mode provides for both semiconductor switches in the circuit extension to be open during the off-commutation of the current from the motor winding. The current then flows via the two diodes, which are connected to the plates of the capacitor, so that the capacitor is charged with an appropriate polarity.

The power semiconductors (transistors) in the two branches (series circuits), which are connected in parallel, of the asymmetric inverter can then be driven in a different operating mode. The variant in which both power semiconductors are closed is of secondary importance.

In a first preferred operating mode, provision is made for the two power semiconductors of the asymmetric inverter to be open. This corresponds to "hard" commutation. The current is carried exclusively via the diodes of the two circuits, which are connected in parallel with one another, of the asymmetric inverter, both the voltage from the main voltage source and the increasing voltage from the additional voltage source ensuring that the phase current decreases very rapidly. A voltage whose value is dependent on the capacitance of the capacitor, the current flow duration into the capacitor and th value of the phase current during the current flow is produced across the capacitor CK.

Another preferred variant of operation provides for one power semiconductor of the asymmetric inverter to be closed (while the other is open) during the off-commutation of the current from the motor winding. This results in "soft" off-commutation; the current then either flows via the diode into the first series circuit or through the diode to the other series circuit, with the off-commutation not taking place via the main voltage source in either case.

If both the power semiconductors in the two series circuits are closed, this results in a capacitor voltage which, as a maximum, reaches the value of the intermediate circuit voltage. This method of operation is of secondary importance.

In one specific variant, during operation of the power converter apparatus according to the invention, one of the semiconductor switches which are associated with the capacitor can be closed (the other is open). This allows the voltage across the capacitor to be limited to a desired value, which is less than the maximum permissible voltage value.

In order to reach the maximum current amplitude quickly when current flows in the motor winding, the two semiconductor switches which are associated with the capacitor ate closed and, furthermore, the power semiconductors which are located in the two branches of the asymmetric inverter are switched on, so that the current is forced to flow into the motor winding quickly due to the increased total voltage. Once the voltage on the capacitor in the circuit extension has fallen to zero, the current flows through the two series circuits, which each comprise a diode and a semiconductor switch and are connected in parallel with the respective plates of the capacitor.

The operating states of the power converter apparatus according to the invention as described above can be combined with the normal operating states in such a way as to approach a predetermined torque profile, to minimize noise, and/or to minimize or to uniformly distribute switching losses. An operating cycle comprises forcing the current to flow into the motor winding with or without an additional voltage from the additional voltage source, soft off-commutation once again with or without an additional voltage, and hard off-commutation, in each case with or without an additional voltage.

The invention covers not only the separate power converter apparatus for a reluctance motor, but also a reluctance motor having such a power converter apparatus. A reluctance motor such as this with a power converter apparatus is preferably used in a vehicle with an electrical drive, with the drive comprising one or more such reluctance motors.

In one preferred embodiment, a connection apparatus is provided, by means of which the power converter apparatus can be connected between the main voltage source and the motor winding. This connection apparatus can also be initiated automatically, for example as a function of the speed in a vehicle, that is to say as a function of the motor speed in a vehicle which is driven by a reluctance motor. Since—as stated—the reluctance motors under discussion here have a poor torque profile at relatively high motor speeds, the circuit extension of the power converter apparatus can be connected at a predetermined motor speed, in order to achieve a torque profile which is good over the entire motor speed range.

BRIEF DESCRIPTION OF THE INVENTION

Exemplary embodiments of the invention will be explained in more detail in the following text with reference to the drawing, in which.

DETAILED DESCRIPTION OF THE PREFERRED EMBODIMENTS

Figure 1:
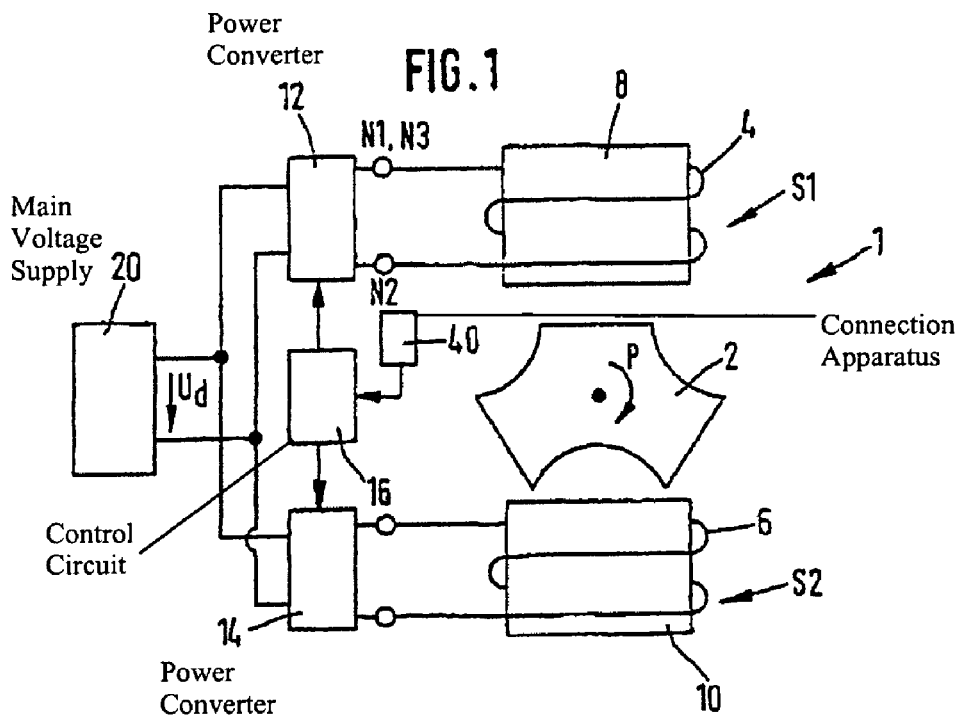
FIG. 1 shows a schematic sketch of a switched reluctance motor with a power converter apparatus, with the figure showing not only the normal arrangement and configuration of a reluctance motor but also the development according to the invention.

FIG. 1 shows, schematically, a switched reluctance motor 1 with a reluctance motor 2 that has three salient poles, and having a stator which has two stator parts S1 and S2. The rotor 2 rotates in the direction of the arrow P corresponding to the current flow in the two stator parts S1 and S2.

The stator part S1 contains a motor winding 4 with a core 8, while the stator part S2 contains a motor winding 6 with a core 10.

The two motor windings 4 and 6 are fed from power converter apparatuses 12 and 14, respectively. The connecting nodes to the power converter apparatus 12 for the motor winding 4 are denoted N1 and N2. The two power converter apparatuses 11 and 12 are fed with a voltage $U_d$ from a main voltage source 20 which is in the form of a DC voltage intermediate circuit here. The control device 16 controls the switching power semiconductors which are located in the two power converter apparatuses 11 and 14, which are identical but are driven with a time offset.

Only one power converter apparatus will be described in each case in the following text, as being representative of the two power converter apparatuses 12 and 14.

Figure 2:
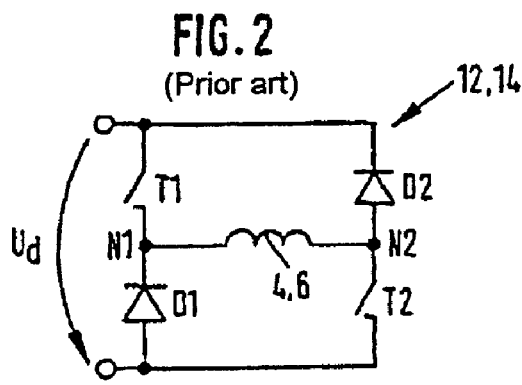
FIG. 2 shows a sketch of a conventional power converter apparatus for a reluctance motor of the type shown in FIG. 1.

FIG. 2 shows, schematically, the design of a power converter apparatus 12 or 14 which is in the form of an asymmetric inverter. Two series circuits, which each comprise a switchable power semiconductor (power transistors) T1, T2 and a diode D1, D2, are connected in parallel with the voltage $U_d$ coming from the main voltage source 20.

By driving the power semiconductors T1 and T2 at the correct time, that is to say by closing and opening the two "switches" T1 and T2 at the correct time, current flows to the motor winding 4 or 6, respectively, or the current is off-commutated.

Figure 3:
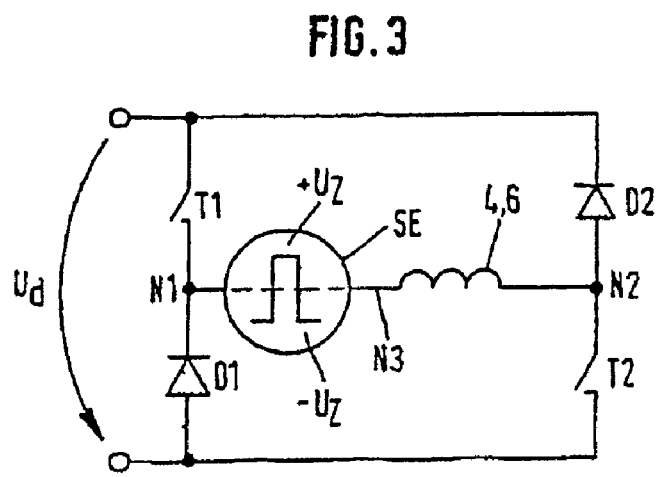
FIG. 3 shows a schematic view of a power converter apparatus according to the invention, which differs from the known power converter apparatus as shown in FIG. 2 by having a circuit extension SE.

FIG. 3 shows, schematically, the idea according to the invention, namely of connecting a circuit extension SE between the motor winding and the connecting nodes N1 of the series circuit which is formed from the power semiconductor T1 and the diode D1. The circuit extension SE produces an additional driving voltage for flowing to the motor winding, $+U_z$ and a voltage $-U_z$ which speeds up the off-commutation of the coil current.

Figure 4:
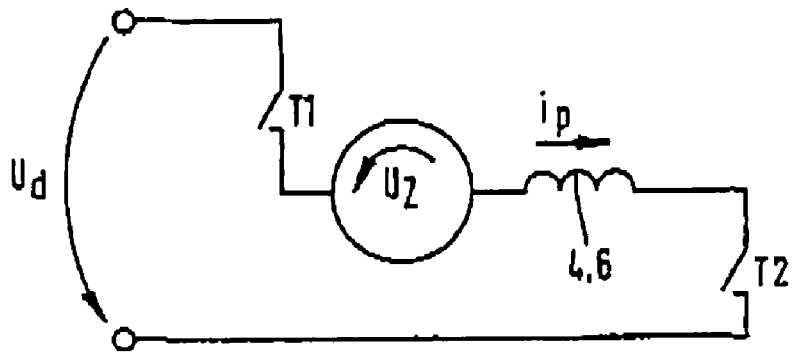
FIGS. 4 and 5 show schematic illustrations of a power converter apparatus in the "current flow" and "off-commutation" operating states.

FIG. 4 shows, schematically, the current flow to the motor winding 4 or 6. The current $i_p$ which flows through the motor winding is increased by the additional voltage $U_z$, which is additively superimposed on the voltage $U_d$ from the main voltage source, so that the desired high current amplitude is reached quickly.

Figure 5:
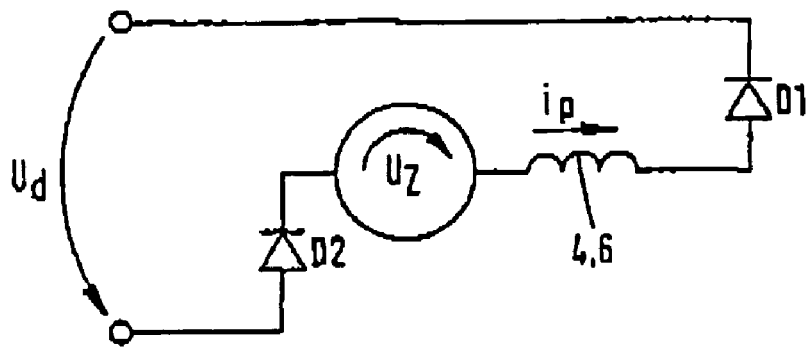

According to FIG. 5, the off-commutation of the coil current $i_p$ is carried out by opening the two power semiconductor switches T1 and T2, as a consequence of which the current flows through the two diodes D1 and D2. The off-commutation of the coil current is speeded up by the fact that the voltage $U_z$ now has the opposite polarity to that shown in FIG. 4.

Figure 6:
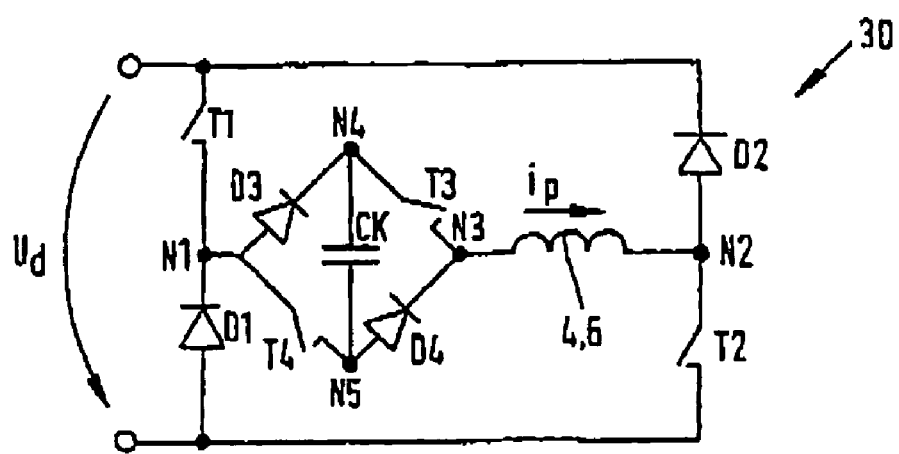
FIG. 6 shows a schematic illustration of one specific embodiment of a power converter apparatus according to the invention.

FIG. 6 shows an embodiment for the additional voltage source which is connected between the connecting nodes N1 between the two components T1 and D1 and the motor winding. Two series circuits which are connected in parallel with one another and each comprise a diode D3 and D4, respectively, and a semiconductor switch T3 and T4, respectively, are each connected to one plate of a capacitor CK. The connecting nodes between the two semiconductor switches T3 and T4, respectively, and the diodes D3 and D4, respectively, are denoted N4 and N5, respectively.

Figure 7:
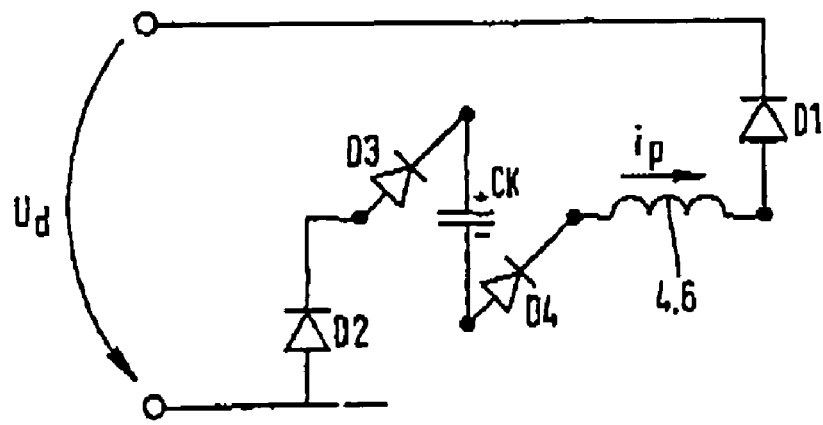
FIGS. 7, 8 and 9 each show, schematically, a power converter apparatus according to the invention in a given operating state.
Figure 8:
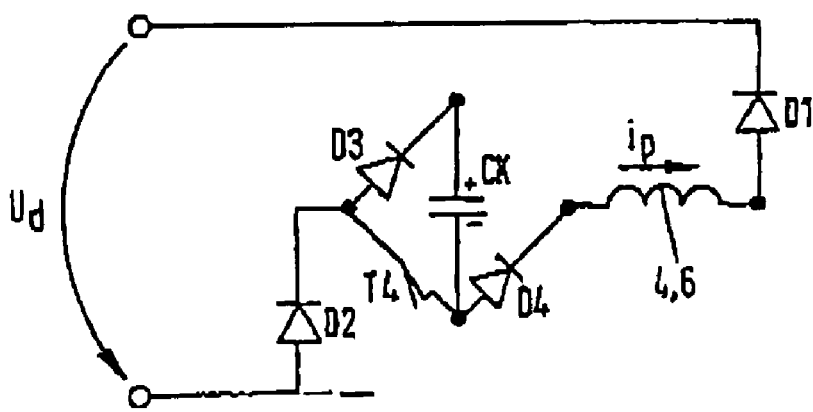
Figure 9:
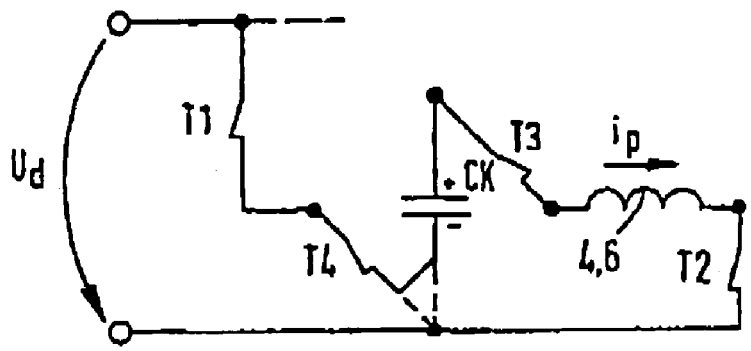

Various possible operating states of the power converter apparatus as shown in FIGS. 7 to 9 will be explained in more detail in the following text. The various operating states include current flowing to and the off-commutation of the current for the motor windings 4 and 6. In order to assist the current flow and to reach the maximum current amplitude in the motor winding more quickly, the two semiconductor switches T3 and T4 are closed, once the capacitor CK has been charged. In order to speed up the off-commutation of the current from the motor winding, the two semiconductor switches T3 and T4 are opened, as is illustrated in FIG. 6.

If the two power semiconductors T1 and T2 are closed, while T3 and T4 are opened, the capacitor can be charged until the current in the motor winding decreases to zero. The additional voltage is then equal to the intermediate circuit voltage. This method of operation is of secondary importance in practice.

T1 or T2 is opened for "soft" off-commutation of the current in the motor winding. In consequence, the current flows via D1 or D2. The off-commutation does not take place via the DC voltage intermediate circuit. A voltage is built up across the capacitor CK. The maximum voltage value depends on the capacitance of the capacitor, the time for which the current flows and the profile of the current while it is flowing. Care should be taken to ensure that the capacitor CK is charged only for as long as its maximum permissible voltage and the maximum permissible voltage on the connected power semiconductor D3, D4, T3, T4 are not exceeded. Alternatively, it is also possible to adapt the voltage class and/or the capacitance of the capacitor, and/or the voltage class of the connected power semiconductors.

"Hard" off-commutation of the current in the motor winding is carried out by opening T1 and T2. In this state, the current flows exclusively via the diodes, as is shown in FIG. 7 (see also FIG. 5). The off-commutation of the current is enhanced by the additional voltage which is provided by the capacitor CK. The energy flows not only into the DC voltage intermediate circuit but also into the capacitor CK. What was stated in the preceding item also applies to the voltage on the capacitor.

The value of the voltage across the capacitor CK can be kept constant by closing one of the two semiconductor switches (transistors) T3 and T4, as is illustrated for the semiconductor switch T4 in FIG. 8.

In order to speed up, that is to say to additionally drive, the current in the motor winding as shown in the schematic illustration in FIG. 4, the two semiconductor switches T3 and T4 as well as the two power semiconductors T1 and T2 (all the elements T1, T2, T3 and T4 may be the same component types) are closed. The voltage across the capacitor CK, whose connection to N4 has positive polarity owing to the preceding charging process, is added to the voltage $U_d$. When current flows to the motor winding, the capacitor voltage across CK decreases. When the voltage is approximately zero, the current then flows from the node N1 (FIG. 6) via the two series circuits D3, T3 and T4, D4, to the node N3 for the respective motor winding 4 or 6.

The operating states described above with and without the use of the additional voltage source formed by the capacitor CK can be controlled in the respectively desired manner by appropriately driving the power semiconductors T1 and T2 and the semiconductor switches T3 and T4, so as to achieve desired motor operation, that is to say for example a specific torque profile, minimizing the amount of noise produced during motor operation, or optimum distribution of the switching losses between the individual semiconductor switches and power semiconductors.

The two semiconductor switches T3 and T4 which are associated with the capacitor are driven by the control device 16 as shown in FIG. 1, matched to the driving of the power semiconductors T1 and T2. The control device 16 controls the semiconductor switches T3 and T4 in synchronism with the power semiconductors T1 and T2, to be precise with a phase offset for the two power converter apparatuses 12 and 14 for the reluctance motor.

A reluctance motor such as this can advantageously be used in an electrically powered vehicle in which, for example, each driven wheel has its own associated reluctance motor. In order to avoid a deterioration in the torque at high motor speeds, the circuit extension SE as illustrated schematically in FIG. 3 and, as shown in FIG. 6, comprising the circuit between the nodes N1 and N3, can be connected to the "conventional" power converter apparatus 12 or 14, as is indicated at the top of FIG. 1 by the node N3 for the motor winding 4. This connection process can be carried out manually via a connection apparatus 40. This connection apparatus 40 can also be activated automatically as a function of the motor speed.

What is claimed is:

1. A power converter apparatus for one of two or more motor windings on a reluctance motor, comprising:
   an asymmetric inverter including a semiconductor switch arrangement, fed from a main voltage source;
   an additional voltage source with a variable polarity connected in series with the motor winding, and
   a control device, matched to the operation of the inverter, to
   a) provide an additional positive driving voltage from the additional voltage source when a current is flowing through the motor winding; and/or
   b) assist the off-commutation of the current from the motor winding by means of an additional negative voltage from the additional voltage source, and
   c) when required, make the additional voltage source inoperative.

2. The power converter apparatus as claimed in claim 1, wherein
   the additional voltage source produces a variable amplitude voltage.

3. The power converter apparatus as claimed in claim 1, wherein
   the additional voltage source is formed by an energy store which is connected to and fed from the motor winding.

4. The power converter apparatus as claimed in claim 1, wherein
   the additional voltage source comprises drivable semiconductor switches and a capacitor connected in series with the motor winding and with the main voltage source by the drivable semiconductor switches.

5. The power converter apparatus as claimed in claim 4, wherein
   the semiconductor switch arrangement of the asymmetric inverter includes two series circuits each comprising a switchable power semiconductor including a series connected transistor and a diode, both of the series circuits being connected in parallel with the main voltage source;
   the motor winding and the capacitor are connected in series between connecting nodes of the two series circuits; and
   the capacitor is connected by the drivable semiconductor switches and the power semiconductors such that energy is drawn from the capacitor, energy is stored-in the capacitor, or charge of the capacitor is not changed.

6. The power converter apparatus as claimed in claim 5, further comprising
   two additional series circuits, each comprising a diode and one of the drivable semiconductor switches, connected to a respective one of the plates of the capacitor, and connecting nodes of the two additional series circuits are connected to the connecting nodes of one of the two series circuits of the asymmetric inverter and, respectively, to the motor winding.

7. The power converter apparatus as claimed in claim 6, wherein
   both drivable semiconductor switches in the two additional series circuits are open during off-commutation of the current from the motor winding.

8. The power converter apparatus as claimed in claim 7, wherein
   both switchable power semiconductors of the asymmetric inverter are open during the off-commutation of the current from the motor winding.

9. The power converter apparatus as claimed in claim 6, wherein
   one of the switchable power semiconductors is closed during the off-commutation of the current from the motor winding.

10. The power converter apparatus as claimed in claim 7, wherein
    one of the drivable semiconductor switches is closed, whereby the charge on the capacitor does not change.

11. The power converter apparatus as claimed in claim 6, wherein
    the drivable semiconductor switches which are associated with the capacitor are both closed.

12. The power converter apparatus as claimed in claim 1, wherein
    a sequence of operating states "current flow" with/without an additional driving voltage, "soft off-commutation" with/without an additional braking voltage and "hard off-communication" with/without additional braking voltage are controlled by the control device such that a predetermined operating behavior is achieved for the motor.

13. A reluctance motor having at least one power converter apparatus as claimed in claim 1.

14. In a vehicle having an electrical drive, the improvement wherein the electrical drive comprises at least one reluctance motors as recited in claim 13.

15. The vehicle as claimed in claim 14, further comprising
    a connection apparatus, by means of which the power converter apparatus is connected between the main voltage source and the motor winding.

16. The vehicle as claimed in claim 15, wherein
    the connection apparatus is operated automatically at a predetermined motor speed.

* * * * *